United States Patent [19]

Curlander et al.

[11] 4,167,041
[45] Sep. 4, 1979

[54] STATUS REPORTING

[75] Inventors: Paul J. Curlander, Cambridge, Mass.; Ted A. Rehage, Longmont, Colo.

[73] Assignee: International Business Machines Corporation, Armonk, N.Y.

[21] Appl. No.: 784,751

[22] Filed: Apr. 5, 1977

[51] Int. Cl.² ............................................. G06F 11/06
[52] U.S. Cl. .................................................... 364/900
[58] Field of Search ... 364/200 MS File, 900 MS File

[56] References Cited
U.S. PATENT DOCUMENTS

| 3,160,857 | 12/1964 | Frush | 364/200 |
|---|---|---|---|
| 3,345,616 | 10/1967 | Avril et al. | 364/200 |
| 3,585,599 | 6/1971 | Hitt | 364/200 |
| 3,599,179 | 8/1971 | Arnold | 364/200 |
| 3,731,279 | 5/1973 | Halsall et al. | 364/200 |
| 3,771,131 | 11/1973 | Ling | 364/200 |
| 3,972,031 | 7/1976 | Riemenschneider et al. | 340/173 R |
| 4,005,392 | 1/1977 | Akatsuka et al. | 364/200 |

Primary Examiner—Gareth D. Shaw
Assistant Examiner—Eddie Chan
Attorney, Agent, or Firm—Herbert F. Somermeyer

[57] ABSTRACT

In a plural unit system, particularly of the data processing type, controlled units such as tape drives, constitute status reporting units (SRUs) which report status including error conditions to one or more status analyzing units such as computers (CPUs), programmable controllers, and the like. Each of the SRUs has a register, such as a shift register, associated therewith for receiving error status indications. The signal state of the shift register when all zeros indicates error-free status, any nonzero state signifies an error. An OR circuit receives signals from all of the bit positions of each of the respective shift registers and combines same into an SRU group error indicating signal. A second register, also a shift register, associated with the respective SRUs receives the output of the OR circuit in one of its bit positions, the bit position indicating the address of the reporting SRU. The output of the two shift registers associated with each of the SRUs are serialized onto one wire and supplied to an intermediate shift register. Combined signal status in the intermediate shift register are then supplied to one or more status analyzing units in a two byte format, i.e., one byte for the address and a second byte for the error status. An appropriate status analyzing unit then determines the error condition of the SRU. If more than one SRU is in error, then the address byte will have more than one binary one indicating state requiring further analysis by the respective status analyzing units.

17 Claims, 3 Drawing Figures

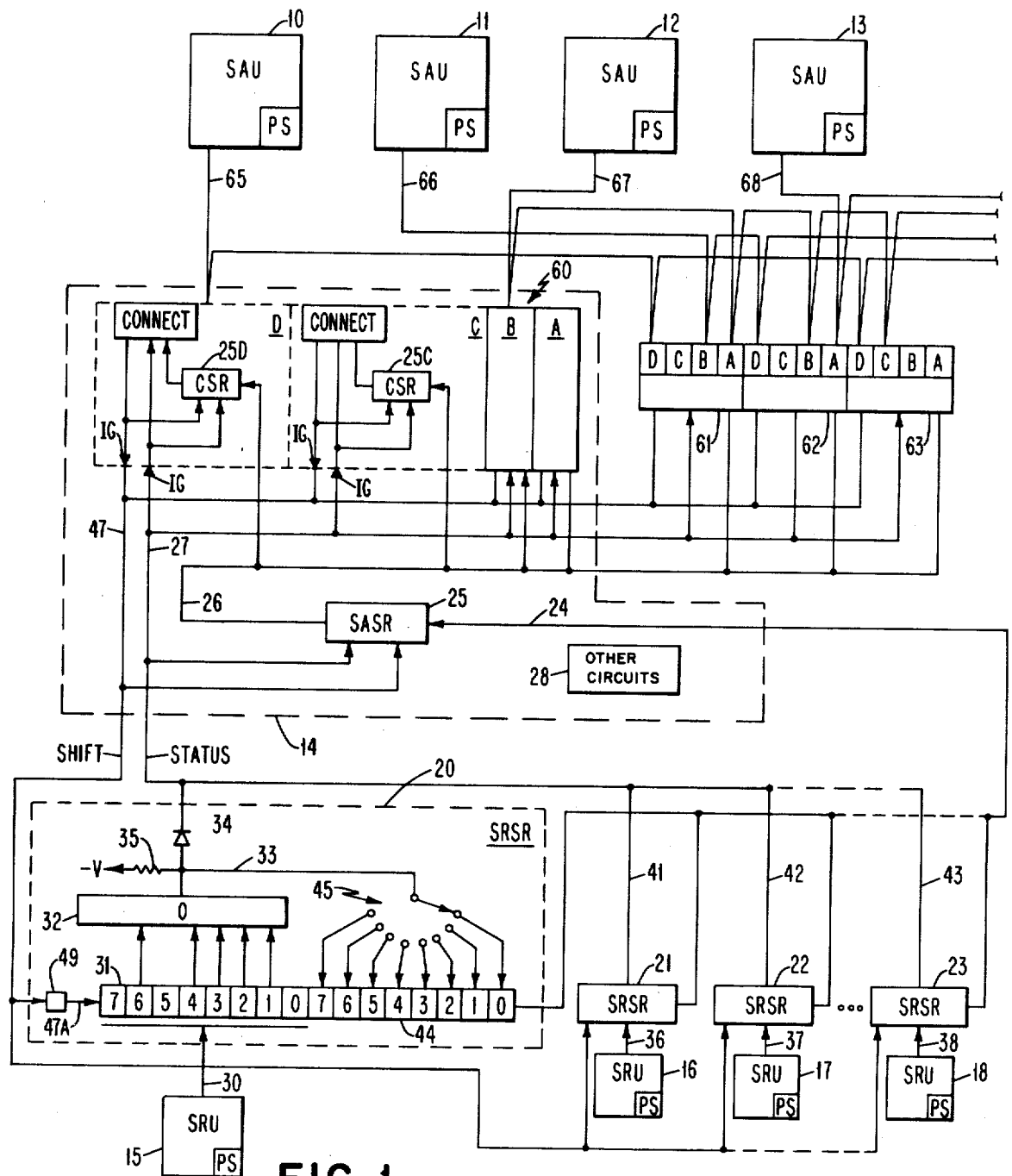
FIG. 1
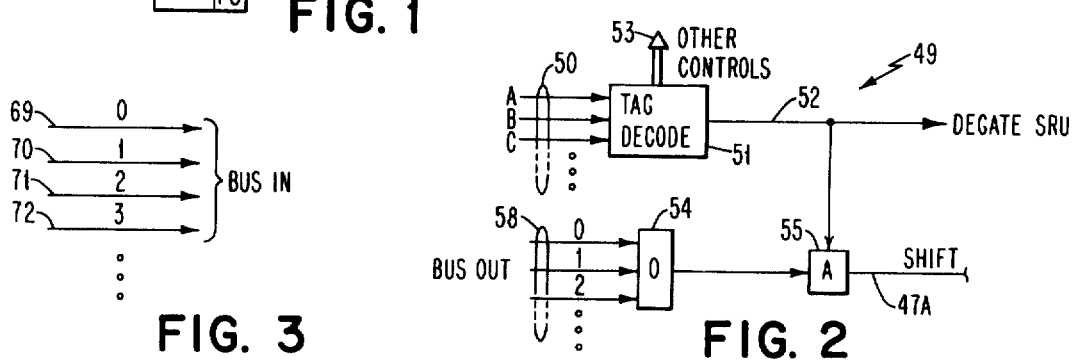
FIG. 3
FIG. 2

STATUS REPORTING

BACKGROUND OF THE INVENTION

The present invention relates to status reporting units, particularly those units which reliably report status signals from one or more status reporting units (SRUs). In data processing systems having a plurality of interconnected data processing units such as computers, tape drives, disk files, printers, display units and the like, diagnosis of error status including the detection that an error has occurred becomes a complex problem. The difficulty arises in that the status reporting circuits themselves may have an error condition, thereby blocking report of an error condition in an associated unit. It is desired to control the cost of such units by providing a simple yet effective error tolerant status reporting system.

SUMMARY OF THE INVENTION

It is an object of the present invention to provide a simple yet reliable error status reporting system for use in a plural unit system.

Each of the reporting units which is usually a controlled unit contains first and second registers, each register having a plurality of stages. The first register receives status signals to be reported. The second register is an address register which receives a combined signal via an OR circuit from the first register for indicating the address of the reporting unit whenever an error status is to be reported. Alternately, a single second register may indicate addresses for reporting units.

In a system embodying the invention a plurality of such reporting units has a corresponding plurality of first and second registers. The outputs of the respective OR circuits are combined together to provide an alert signal for initiating action by controlling unit to acquire the status in preparation for remedial action. In a preferred form, the outputs of the first and second registers from all of the controlled units are dot ORed together to provide a single two register length status word which includes the error status plus the address of the corresponding error. In the event more than one unit is reporting errors, which is rare, then the location of the specific error with respect to the reporting units must be ascertained by further diagnostics. In the event of a single error the error condition corresponding with the address indicated in the status word indicates the type of error plus the address of the status reporting unit. The status analyzing unit actuates shift of the information from one or more status analyzing units for analysis. In a preferred form, each of the reporting units and the status analyzing units have independent power supplies and the arrangement is such that when one of the reporting units has a power down an alert signal is sounded.

The foregoing and other objects, features, and advantages of the invention will be apparent from the following more particular description of preferred embodiments of the invention, as illustrated in the accompanying drawings.

THE DRAWINGS

FIG. 1 is a diagrammatic and schematic diagram of apparatus employing the present invention.

FIG. 2 diagramatically shows a tag decode control circuit usable in the FIG. 1 illustrated apparatus.

FIG. 3 shows bus in status reporting connections.

DETAILED DESCRIPTION

The illustrated system can be a data processing subsystem having a plurality of controlling units such as programmable controllers 10–13, connected to a plurality of hosts (not shown) via channel means well known in the data processing arts. Each of the controlling units is considered as a status analyzing unit 10, 11, 12 or 13, each with an independent power supply PS. Such controlling units 10–13 are connected as shown by channel means 65–68 to a plurality of connection adaptors 60–63. Each means 65–68 includes a multiwire daisy-chain connection circuit (not shown) and cables of known design. The type of I/O connection for the International Business Machines Corporation, Armonk, NY, System 370 Model 158 may be used for daisy-chain connection means 65–68, no limitation thereto intended. The adaptors 60–63 are connected to an attachment unit 14 which in turn attaches to controlled units 15–18. Adaptor 60 is physically in attachment unit 14; adaptors 61–63 are physically in other attachment units (not shown). In such a system, a myriad of connections are possible. In a data processing environment units 15–18 may consist of tape drives (magnetic recorders), disk file type of magnetic recorders, printing units, display units, and the like. Each of such controlled units 15–18 may be mixed in a data processing system and is considered as a status reporting unit SRU. In this figure four SRUs 15, 16, 17 and 18 are shown as being controlled by the status analyzing units 10–13 via attachment unit 14 which also has its own power supply PS. Connections, except for status reporting connections, between adaptors 60–63 of attachment unit 14, and SRUs 15–18, are omitted for clarity. Such connections can be the daisy-chain connections mentioned above, one-for-one connections wherein one adaptor connects to one SRU, one adaptor can be directly connected to plural SRUs, etc. Other circuits 28 represent attachment 14 circuits necessary for such connections, as well as a microcomputer to perform connection functions as is known. Each adaptor 60–63 has connection circuits A, B, C and D for connecting to an SAU 10–13 via the daisy-chain channel means 65–68. Any combination of interconnections may be employed.

For maintaining efficiency of a data processing installation it is important that the status analyzing units (SAU) 10–13 know immediately of any error conditions occurring in any of the SRUs 15–18. To this end shift register status reporters (SRSR) 20–23 are respectively connected to SRUs 15–18 for receiving status signals therefrom. Each of the SRSRs has an output for supplying status signals to a common status signal transferring line 24 to other status accumulating or intermediate shift register SASR 25 in attachment unit 14. From SASR 25 status signals are transferred over bus 26 to the adaptors 60–63 via connection shift registers, as CSRs 25C and 25D, for transfer to one of the status analyzing units 10–13.

Status gathering is initiated by the SRUs 15–18. This is achieved by an alert signal being supplied over line 27 which combines error indicating signals from the respective SRSRs 20–23, SASR 25, and CSRs 25C, D, etc., as will become more apparent. The alert signal on line 27 goes to status analyzing unit 10 via adaptor 60 and means 65. One of the status analyzing units, such as unit 10, is designated as a primary unit. As such, it supplies in response to the alert signal a series of shift and status request signals over means 65, adaptor 60, thence line 47 to all of the illustrated shift registers for shifting the status signals resident in the shift registers to combine status line 24, thence to SASR 25 and line 26. Simultaneously, the line 47 shift signals are supplied to all the shift registers 20-23, 25, 25C, 25D, etc. for inhibiting the transfer of further status signals to the SRSRs 20-23. As will be later described, FIG. 2 shows a preferred practical implementation of the above described control. Based on the above, any "1" signal (error indication) in any shift register 20-23, 25, 25C, 25D, etc., causes status reporting. This arrangement also checks the integrity of the status reporting circuits, SASR, SRSR, and CSRs.

Each of the SRSRs is constructed as shown in detail in SRSR 20. Status from SRU 15 is supplied over cable 30 to the respective stages of a first register 31. A non-zero condition in selected ones of the stages 0-7 of first register 31 are supplied through OR circuit 32 as a group status signal over line 33. Line 33 supplies the group status signal to line 27 via isolation circuits 34, 35. Similarly, all of the SRUs 16-18 plus attachment unit also supply their status signals respectively over cables 36, 37 and 38 to the respective SRSRs 21-23. Each of the SRSRs has an OR circuit corresponding to OR circuit 32 for supplying group status signals respectively over lines 41-43 to line 27 for generating the alert signal.

Each of the SRSRs 20-23 has a second register such as register 44 of SRSR 20. Second register 44 is an address register for indicating the source of the status signals causing the alert signal on line 27. A switch 45 supplies the group status signal from line 33 to a selected one of the stages 0-7 of second register 44. As shown, SRSR 20 has the group status signal on line 33 as supplied to the zero stage of register 44. Similarly, SRSR 21 would have its group status signal supplied to stage #1, SRSR 22 to stage #2, and SRSR 23 to stage #3 of their respective second registers. Alternately, the second registers 44 may be combined into a single register in attachment unit 14.

Once the alert signal has been sent to the status analyzing unit 10 the line 47 shift signals actuate all of the SRSRs simultaneously to shift the signal contents of both the first and second registers such as registers 31 and 44 of SRSR 20 to the combining output status line 24. Since each of the SRSRs has a group status signal to a unique stage position of the second registers, the data pattern in the first byte supplied to SASR 25 indicates the reporting SRU address. The second byte comes from the first registers, such as register 31, and indicates error and other status being reported. In the event two SRUs 15-18 simultaneously have errors, then the second register position 44 will have two bit positions active identifying the two SRUs in error. However, the error status is ambiguous and requires further diagnostic analysis by one or more of the status analyzing units 10-13.

All shift registers 20-23, 25, 25C, 25D, etc. are shifted synchronously and simultaneously. The status signals originally in SASR 25 and CSRs 25C, 25D indicate status of the corresponding circuits, all without address indications. The time position of the status signal indicates source of the status. That is, SASR 25 and all CSRs receive status from circuits respectively adjacent such registers. SASR 25 receives status signals from circuits 28, for example. CSR 25C receives status from the "C" portion of unit 60, etc. The status signals from SRUs 15-18 are shifted through SASR 25 and a CSR, over channel connection 65 to the status analyzing unit 10. With all of the status analyzing units 10-13 being identically constructed, any one can be denominated the primary status analyzing unit. This can be done either manually or dynamically as is known in dynamic reconfiguration of data processing systems.

SAU 10 preferably has an amplifier (not shown) therein for supplying an alert signal whenever any of the group status signals at line 27 are ground reference potential. That is, if the status reporting unit 15 has a power outage it will deactivate the SRSR 20. As a result, ground reference potential is supplied over line 33 to line 27.

Referring next to FIG. 2, control of the SRUs 15-18, attachment unit 14, etc., from SAU 10 during status reporting is shown in diagrammatic form. Each of the channel connections 65-68 includes tag lines and bus lines. Tag lines carry signals for controlling the interpretation of signals supplied over the bus lines. The tag lines extending from an SAU 10 to attachment unit 14 (of which there may be several attachment units 14, not shown), are called tags out. One constructed embodiment included three tag lines which encode control states for interpretation of signals supplied over a bus termed bus out. These tag signals as modified by logic circuits in attachment unit 14 sent to a SAU are called "in" lines; i.e., tags in and bus in.

The tag out lines 50 from SAU 10 are connected to a tag decode circuit 51 within attachment unit 14. Numeral 49 denotes the entire FIG. 2 illustrated circuit as connected within attachment unit 14. Tag decode 51 supplies other control signals over cable 53 to other circuits 28 as well as to the SRUs, such connections being omitted for brevity. When a status signal is being requested in response to having received an alert signal over line 27 the ABC tag combination of tags out 50 indicates status is to be reported and the signal contents of shift registers SRSR 20-23, SASR 25, CSRs 25C et seq are to be shifted through one of the connection circuits 60-63 to SAU 10. That is, tags out 50 correspond to shift control line 47. When the tags out indicate status reporting, tag decode 51 supplies an active signal over line 52 to degate the SRUs 15-18, as well as circuits 28, connection circuits 60-63 or any other status reporting circuits; i.e., prevents the SRUs and other units from supplying further status signals. Additionally, the line 52 signal enables AND circuit 55 to pass clocking signals over line 47A to the SRSRs, SASR and CSRs. The clocking signals are received from SAU 10 via bus out 58; i.e., tag out 50 indicates that signals received over lines 0-2 of bus out 58 are timing signals for shifting status signal contents of the shift registers through channel means 65 to SAU 10.

The shifting of signals through adaptor 60 to SAU 10 is via a bus in connection; for example, a bus in may have eight physical electrical circuits. Each of the adaptors 60-63 is assigned a single wire in bus in for supplying status signals. For example, adaptor 60 supplies all serially received status signals over line 69 to SAU 10. Similarly, adaptor unit 61 can supply all received status signals over line 70 in the same bus in. Similarly, other adaptor units and attachment units can supply signals over designated lines in serial manner over the same bus in to SAU 10. Such connection is shown in FIG. 3 in a diagrammatic way.

While the invention has been particularly shown and described with references to preferred embodiments thereof, it will be understood by those skilled in the art that various changes in form and details may be made therein without departing from the spirit and scope of the invention.

What is claimed is:

1. A status reporting apparatus comprising,
    an addressable unit,
    a first register having a plurality of stages for receiving status signals to be reported from said addressable unit,
    a second register having a plurality of stages,
    a first OR circuit receiving status signals from said first register and supplying a status group signal to one stage of said second register having a position within said second register indicating address of said addressable unit.

2. The apparatus set forth in claim 1 further including a plurality of said addressable units and a corresponding plurality of said first and second registers respectively for receiving status signals from said addressable units, and a plurality of said first OR circuits interconnected such that each of said second registers receives said status group signal in a unique stage position, and
    a circuit connected to output portions of all said first OR circuits for receiving said status group signal for supplying an alert signal.

3. The apparatus set forth in claim 2 including a control circuit for generating a degating signal to said addressable units for inhibiting the supplying of said status signals and including means for supplying shift signals to said first and second registers for transferring signal contents thereof, and
    a common line for receiving transferred signal contents.

4. The apparatus set forth in claim 3 further including an attachment unit and a controlling unit and signal connections therebetween.
    a shift register in said attachment unit connected to said single line for receiving said shifted signal contents, and
    means transferring said shifted signal contents from said one shift register to one of said controlling unit.

5. The apparatus set forth in claim 4 wherein all of said registers are shift registers each of said shift registers being respectively associated with one of said addressable units having a single output connection to said single line whereby the signal contents of all of said associated shift registers are combined as a single set of signals.

6. The apparatus set forth in claim 5 further including an alert line connected to said controlling unit and to all of said first OR circuits for receiving signals thereover for alerting said controlling unit that error status is to be reported.

7. The apparatus set forth in claim 6 wherein said connection between said attachment unit and said controlling unit includes a set of tag out lines, a set of bus out lines, and a set of bus in lines,
    said control circuit being responsive to signals received over said tag out lines to indicate that status signals are to be reported and for activating said degating means for degating said addressable units, and
    circuit means connected to said bus out for receiving signals therefrom and for supplying shift signals to said first and second registers for shifting same through said attachment unit to said controlling unit, and the connection of said bus out to said shifting line being controlled by said tag out lines.

8. The apparatus set forth in claim 1 wherein said first and second registers are shift registers interconnected to form a single shift register train and an output connection being connected to one of said shift registers for receiving a serial train of the signal contents of both of said registers whereby a train of signals indicates status and address from said registers.

9. The apparatus set forth in claim 8 further including a plurality of said first OR circuit and a plurality of output terminals respectively connected to said first OR circuit for supplying an alert signal indicating said first register contains status signals to be reported.

10. The apparatus set forth in claim 9 including the plurality of said first and second register connections wherein all of said output terminals are connected to a common line for generating a single alert signal and all of said output connections being connected to a single line whereby signal contents of all of said first and second registers are merged as a single signal set of status.

11. A data processing status reporting system for reporting status to a controlling unit from one of a plurality of status reporting units SRU comprising,
    an attachment unit electrically interposed between said controlling unit and each of said SRUs and having a shift register for receiving status signals, and means for transferring said received status signals to said controlling unit from said shift register,
    each of said SRUs including at least a first register for containing error status signals indicating error status in the respective SRUs,
    OR circuits each connected to predetermined stages of each of said first registers for indicating error status in a respective one of said SRUs, and means connecting said OR circuits to said controlling unit for indicating detected error status in one of said SRUs, and a single line connection between all of said registers and said attachment unit shift register for receiving status signals simultaneously from all of said registers through said single shift register in said attachment unit.

12. A data processing system set forth in claim 11 further including at least one second register having a plurality of stages, said respective OR circuits being connected to respective ones of said stages indicating an address of an SRU supplying status signals to a respective one of said first registers, and means for shifting the signal content of said first and second registers through said single shift register of said attachment unit as a set of status signals which include address signals.

13. A data processing system set forth in claim 12 wherein a second register is associated with each of said SRUs and having a serial shifting connection with the respective ones of said first registers, each of said separate second registers being connected to a respective one of said OR circuits for receiving a signal to one and only one of its stages for indicating an address of the corresponding or associated SRU, and
    means for simultaneously shifting signal content of all of said first and second registers to said single shift register in said attachment unit.

14. The data processing system set forth in claim 13 further including tag out lines and bus out lines extending from said controlling unit to said attachment unit, and bus in lines extending from said attachment unit to said controlling unit, a decode circuit in said attachment unit responsive to predetermined tag out signals on said tag out lines for indicating degating of said SRUs connected to said attachment unit, and timing circuit means responsive to said tag decode circuit to pass signals from said bus out line to shift the signal contents of all of said shift registers and said one shift register synchronously with signals on said bus out lines, and other circuits connected to said bus in, bus out and tag lines for performing other data processing operations.

15. A status reporting system for a plural unit system, including in combination:
- a plurality of status reporting units (SRU), each said SRU having a status shift register and an address shift register, circuit means responsive to said status register having a predetermined signal content to set said address register to a predetermined address indicating said SRU,
- a status accumulating shift register (SASR) for receiving status signals and having a common input,
- a status connection shift register (CSR),
- an alert line connected to said SRU status shift registers for receiving a predetermined logic sum of signal contents therefrom for indicating that status is to be reported,
- shift means connecting said SRU status shift register to said common input, said SASR to said CSR, whereby signal contents of all said shift registers are shiftable through said CSR, and
- utilization means connected to said CSR for receiving signals therefrom.

16. The system set forth in claim 15 further including a plurality of said CSRs all connected to said SASR for receiving signals from said SASR and a plurality of said utilization means respectively connected to each said CSR.

17. The system set forth in claim 16 further including timing signal lines extending from one of said utilization means to all of said shift registers for timing said shifting of all said shift registers.

* * * * *